3,605,985
APPARATUS AND PROCESS FOR TRANSPORTING ARTICLES FOR LABELING AND THE LIKE
Thomas E. Ellison, Pasadena, Calif., assignor to
Biner-Ellison, Los Angeles, Calif.
Filed Aug. 1, 1969, Ser. No. 846,773
Int. Cl. B65g 47/26
U.S. Cl. 198—34                             17 Claims

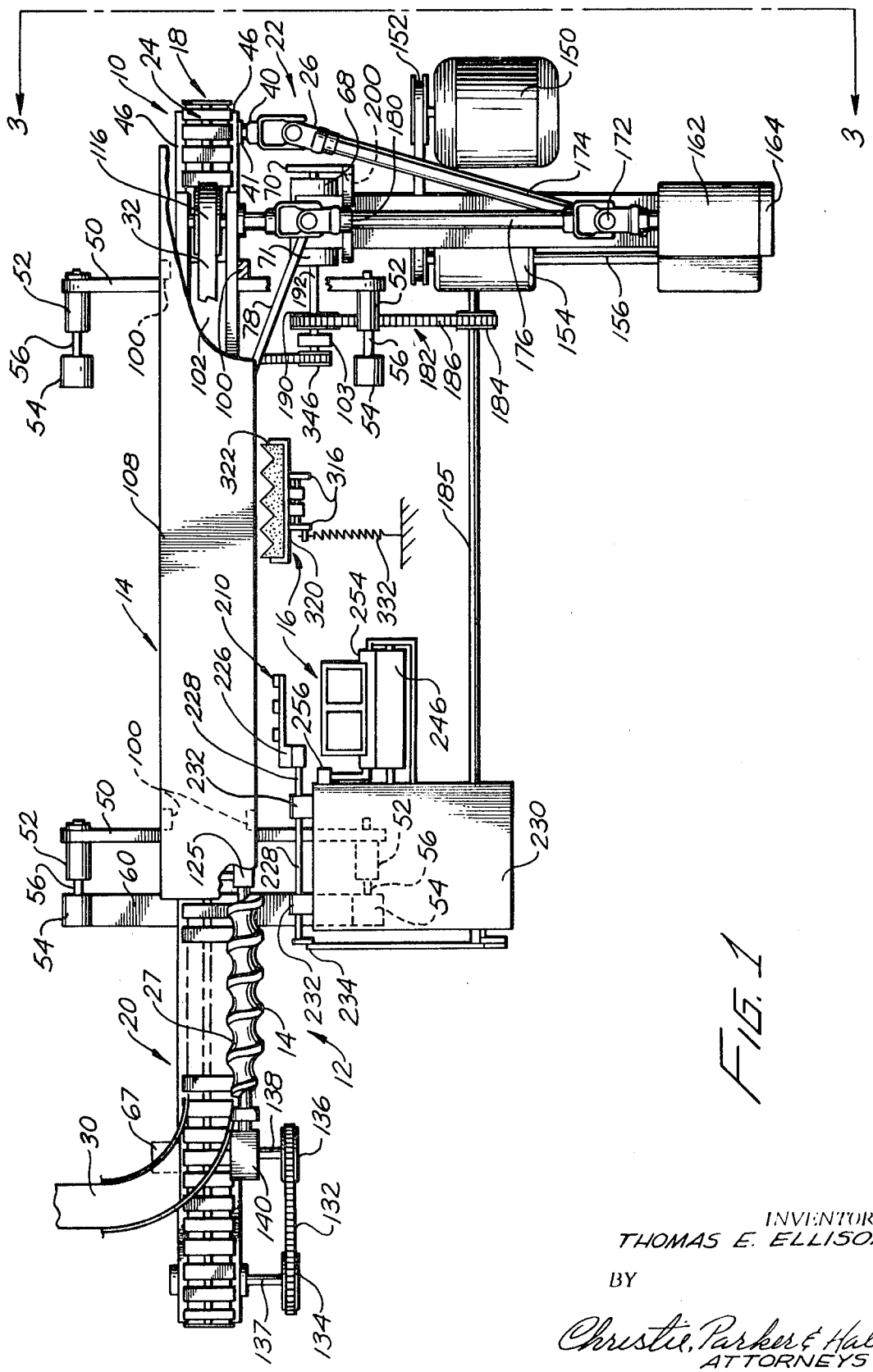

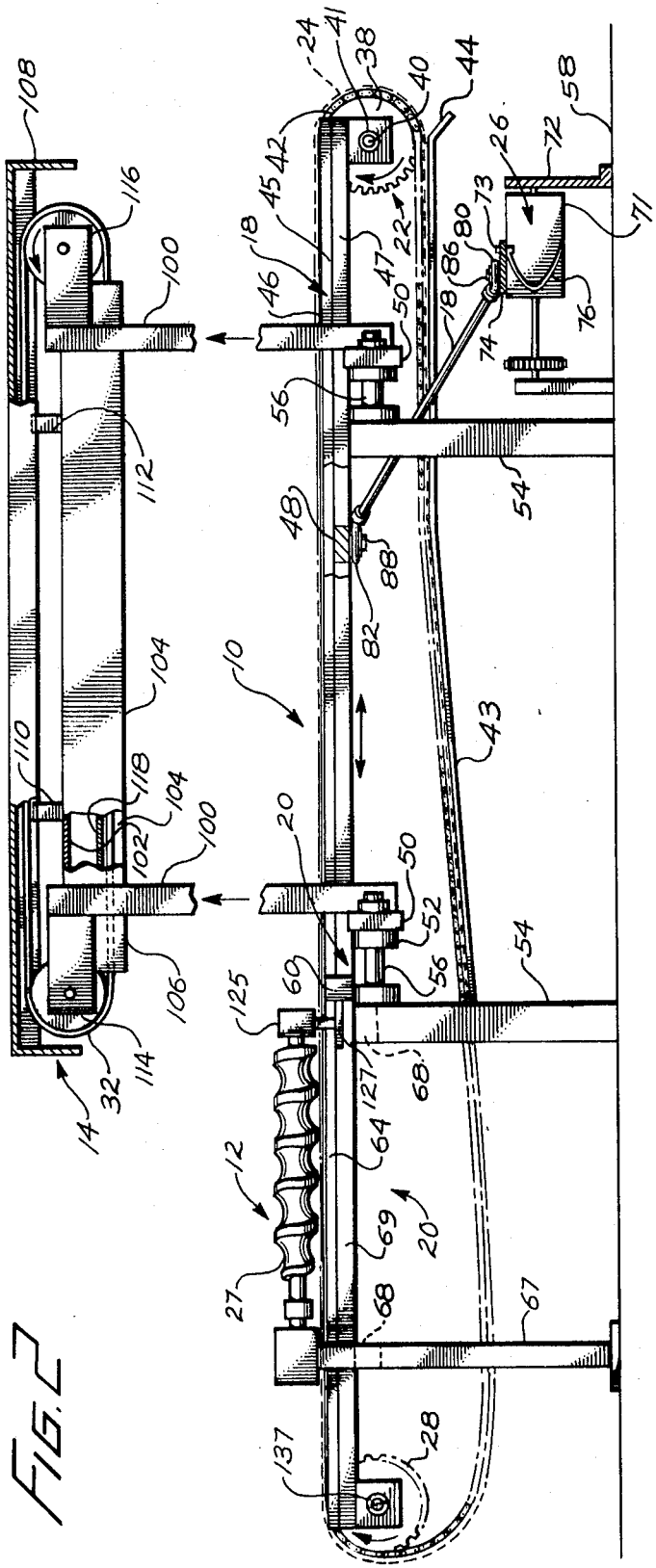

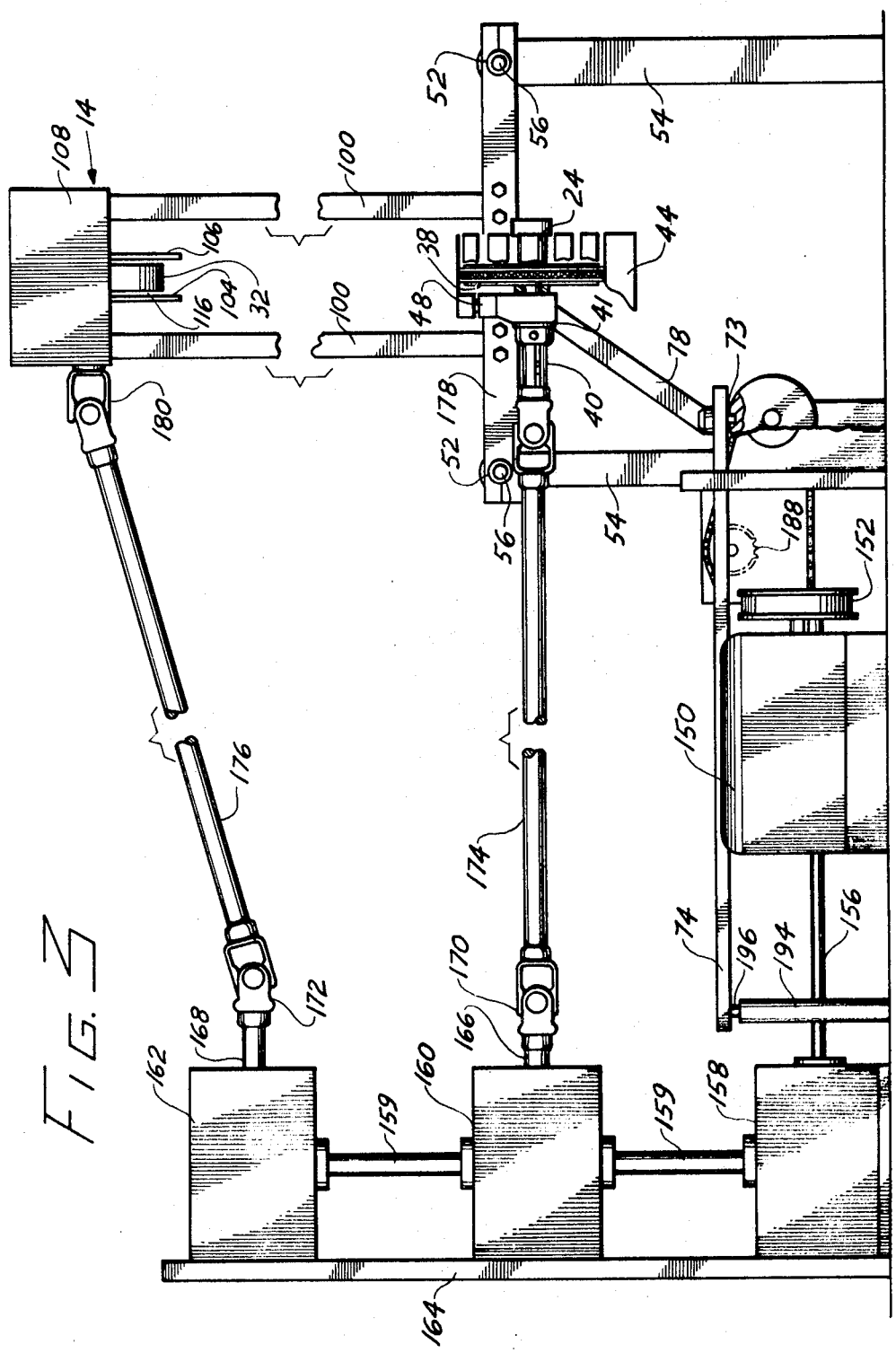

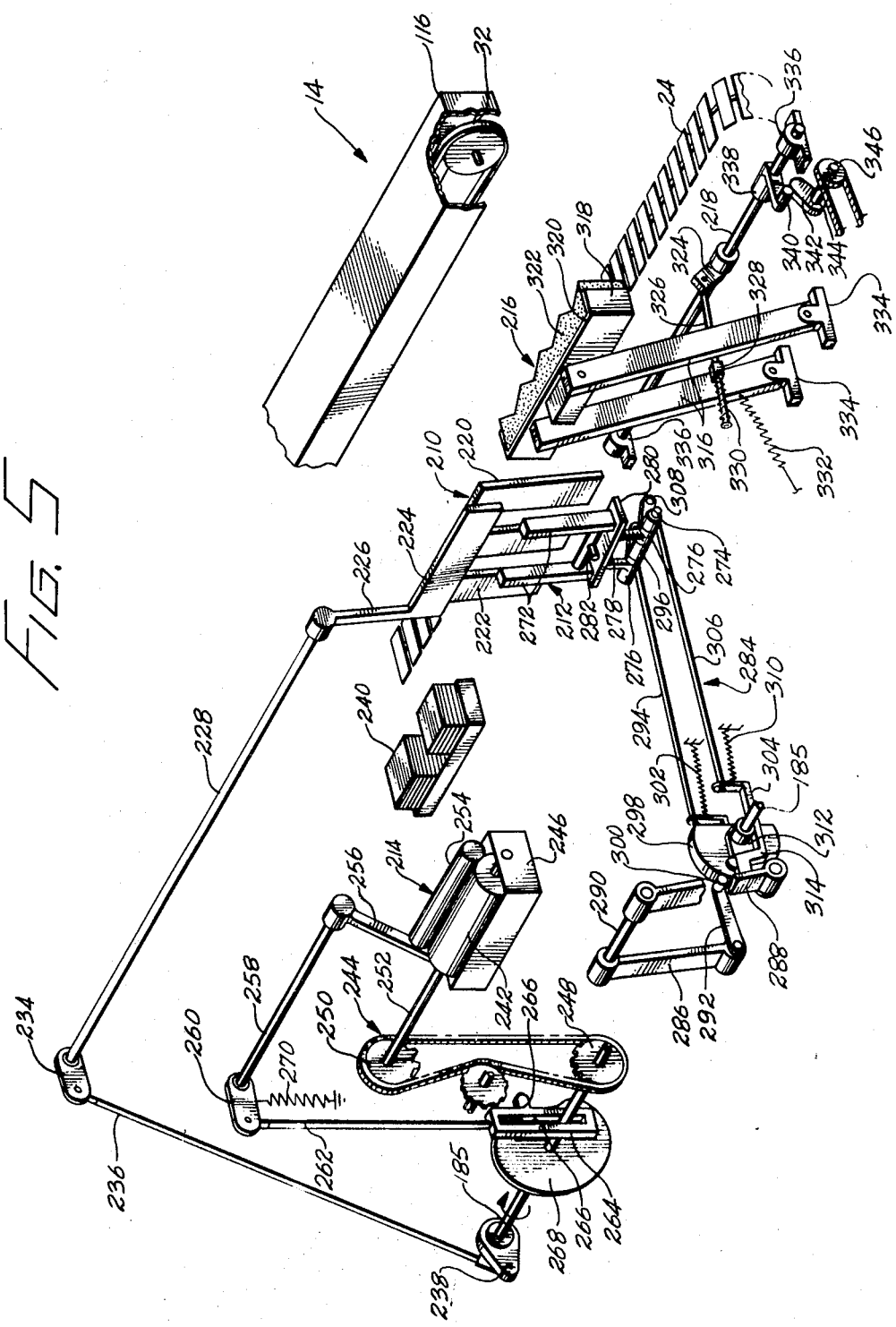

ABSTRACT OF THE DISCLOSURE

An endless conveyor transports articles to be labeled from an input station to an output station and, while transporting the articles, stops the articles at a labeling station. The conveyor is in continuous motion. At selected times, the conveyor is moved at a rate equal to but opposite in direction from its conveying speed. When the conveyor is so moved, the relative motion between articles being conveyed and the labeling station is zero. An input feed screw stops when the relative motion of the articles at the labeling station stops to maintain proper article spacing and avoid an article jam.

BACKGROUND OF THE INVENTION

The present invention relates to conveying apparatuses and processes in general and, more in particular, to a conveying apparatus and process wherein articles are engaged by a labeler or the like as they are being transported from one point to another.

There are many applications where a conveyor is used to convey articles from an input station to an output station with some process performed on the articles between the two stations. Examples of such applications include can seaming, container filling, container capping and container labeling.

All of these applications require that the relative motion between the engaging apparatus and the articles be zero at the point of time when the articles are engaged. Without the relative speed between the engaging apparatus and the articles being zero, article breakage and inadequate processing would be the result.

A specific example of the requirement of zero motion between an article engaging apparatus and conveyed articles is presented in labeling machines. In labeling machines, containers to be labeled are continuously transported along a conveyor. At a point in their transport, labels are affixed to the containers.

In the labeling industry there have been two approaches taken to effecting zero motion of containers relative to the labeling apparatus. The first of these approaches, which gained acceptance many years ago, envisions the use of a continuous conveyor which literally stopped at a labeling station. The conveyor reciprocated between the input and output stations to receive bottles and to deliver them. Bottles were stopped during their labeling by a top grip assembly. The top grip assembly typically took the form of a spring-loaded retaining cup which engaged bottle tops as they progressed into the cup's path. The top grip assembly also prevented the containers from going back toward the input station when the conveyor was traveling in that direction. This prior art labeling machine proved highly satisfactory throughout the industry, but it was handicapped by its complexity and relatively low article handling rate.

A second type of labeling machine is described in U.S. Pat. 2,930,630 to Carter. This labeling machine effected its labeling function by a label applicator which was made to move during labeling at the linear rate of speed of articles being conveyed along a conveyor. The Carter device, then, produced continuous, uninterrupted transport and labeling of articles. While effective, the device described in the Carter patent is extremely complex.

Thus there is a present need for an apparatus and process for conveying articles from one point to another, while the articles are being engaged at a station, such as a labeling station, which is easy to operate, economical to produce, and of relatively simple and inexpensive construction.

SUMMARY OF THE INVENTION

The present invention provides an apparatus and process which conveys articles from an input to an output station while admitting to the engagement of the articles so conveyed during their transport. Articles are brought to zero motion relative to an article engaging station by translating a continuously driven conveyor at the same rate of speed as the conveyor, but in the opposite direction of conveyor motion during the time that articles are engaged. By translating the continuously driven conveyor in the opposite direction from its conveying direction, an extremely simple, reliable and economical conveying system is provided.

In one form the present invention contemplates an apparatus for transporting articles from an input station to an output station while the articles are engaged by an apparatus at a station along the article's path. The station may be, for example, a labeling station. An endless article conveyor is provided for transporting the articles from the input station to the output station. Means such as a sprocket and chain drive is operable to continuously drive the endless conveyor in a direction to transport articles toward the output station. Means is also provided to selectively translate the endless conveyor, at least at the engaging station, toward the input station at a rate of speed equal to but opposite in direction from the rate of speed of the conveyor. When the translating means is in operation, then, the motion of conveyed articles relative to the engaging station is at least substantially zero during the time articles are being engaged. The translating means may include a barrel cam having a camming slot so configured as to translate a reciprocable shaft. The shaft is attached to a movable bed which supports the conveyor. Thus, as the conveyor is being driven by its drive, the barrel cam reciprocates the shaft to physically move at least a portion of the conveyor in a direction opposite the conveyor's motion to present the articles to the engaging station at zero speed. When the shaft moves in the direction of the moving conveyor, articles move along the latter to the output station.

The present invention also contemplates a unique feed system which automatically stops the input of articles to the conveyor when the conveyor is being translated toward the input station. The unique feed system, thus, prevents article jamming and enables proper article spacing. An input mechanism, which may be in the form of a feed screw, is operated by the conveyor. The power takeoff for the feed screw is from a point on the conveyor which does not undergo translation. Thus when translation toward the input station does occur, the conveyor stops and the power to the feed screw also stops. A specific form of this feature of the present invention contemplates a translatable bed portion of the article conveyor which carries the conveyor's drive. A stationary portion of the article conveyor is provided which is operably coupled to the feed screw as by a chain and sprocket drive. This sprocket is driven by the conveyor. Thus, when conveyor motion is zero, the sprocket stops and so does the feed screw.

The present invention also contemplates a unique top grip assembly which is useful in preventing article displacement from the conveyor by the engaging means. The top grip assembly is carried by a bed which translates with the conveyor. The top grip assembly has a conveyor which is continuously driven at the same rate of speed as the article conveyor such that articles engaged by it are always synchronized with the article conveyor.

In terms of process, the present invention contemplates feeding articles onto an endless article conveyor which is constantly and continuously being driven in a direction to transport the articles past an engaging station. As an article, or a group of articles, reaches the engaging station, the article conveyor is translated in a direction opposite that of its conveying direction but at the same rate of speed to effect zero motion of the articles at the engaging station. The articles are then engaged. After engagement, the conveyor transports the articles toward the conveyor output. As in the apparatus of the present invention, the feeding of the articles may be automatically stopped with the stopping of the relative motion of the articles at the engaging station. The top grip or similar assembly for maintaining article orientation during engagement at the engaging station may synchronously be coupled to the article conveyor such that there is no relative motion between the article conveyor and the top grip at any time.

The present invention offers an apparatus and process which expeditiously and simply transports articles from an input station to an output station while allowing the articles to be engaged at an engaging station. The conveyor drive is continuously operable and thus when article arrest at the engaging station occurs the conveyor is still being driven. When the article conveyor ceases to be translated in a direction opposite from the conveying direction, articles are immediately transported by the conveyor toward the output station. This provides a relatively fast conveyor system which arrests or stops articles for engagement by the simple expedient of translating the conveyor in a direction opposite that of conveyor motion. This means that time of article arrest is at a minimum inasmuch as it can be correlated with the time for engagement of the article without the necessity for bringing a conveyor back up to conveying speed. Complicated gripping mechanisms which were required with the reciprocating type of labeling device described earlier are therefore avoided. At the same time, by effecting article arrest at the engagement station, there is no need to have elaborate mechanisms for moving an engaging mechanism with the articles during the engagement portion of a cycle. The unique coupling of the article feed device to the conveyor also provides an extremely simple means for effecting substantially continuous infeeding of articles without the risk of article jam-up, loss of indexing or breakage which would otherwise occur because of the type of article conveyor motion that the present invention provides. Moreover, the unique coupling of the top grip assembly of the present invention with the translatable portion of the conveyor provides a simple means for securing an article during its engagement.

These and other features, aspects and advantages of the present invention will become more apparent from the following description, appended claims and drawings.

BRIEF DESCRIPTION OF THE FIGURES

FIG. 1 is a top plan view, partly broken away, of a labeling apparatus in accordance with the present invention;

FIG. 2 is a partial elevational view of the embodiment of the invention illustrated in FIG. 1 illustrating the unique means for translating the illustrated conveyor in a manner to arrest motion of articles conveyed at the labeling station depicted in FIG. 1;

FIG. 3 is a view of the labeling apparatus illustrated in FIG. 1 taken along line 3—3;

FIG. 4 depicts a typical means of coupling a translatable section of the conveyor assembly with a stationary portion thereof; and FIG. 5 is a schematic view illustrating the drives for the label applicator devices of the present invention.

DESCRIPTION OF THE PREFERRED EMBODIMENTS

The illustrated apparatus of the present invention generally includes a conveyor assembly 10, an article feed assembly 12, a top grip assembly 14 and a labeling assembly 16.

As illustrated to best effect in FIG. 2, the conveyor assembly has a translatable section 18 and a stationary section 20. The conveyor assembly also has a drive 22 for driving an endless conveyor belt 24. A barrel cam drive 26 is provided for translating the translatable section back and forth along the line of movement of the conveyor belt at predetermined times.

With reference to FIGS. 1 and 2, article feed assembly 12 includes a feed screw 27 which is drive-coupled to an idler wheel or sprocket 28 of the conveyor assembly. Idler sprocket 28 is driven by conveyor belt 24. When the conveyor belt drives the idler sprocket, the feed screw is capable of advancing articles from an input means, such as a conveyor 30, onto conveyor belt 24.

Top grip assembly 14 is mounted for movement with translatable section 18 of conveyor assembly 10. The top grip assembly includes an endless belt 32 which engages the tops of articles being conveyed along conveyor belt 24 to maintain these articles on the conveyor when the articles are engaged by labeling assembly 16.

Labeling assembly 16 applies labels to articles at a labeling station when the articles are stopped relative to the labeling assembly.

Before describing the apparatus of the present invention in greater detail a brief description of its purpose and operation is presented.

Basically, many conveying apparatuses are required to transport articles from one station to another with some operation or process performed on the articles between the stations. The articles must be stopped when the process is performed. Specifically with reference to the apparatus described here, bottles or other containers are transported from an input station to a labeling station where labels are applied by a labeling assembly and from the labeling station to an output station. At the labeling station, the bottles are stopped. The present invention envisions the translation of translatable section 18 in a direction opposite to that of the line of movement of conveyor belt 24 such that bottles are stopped at the labeling station during labeling. In short, during labeling the translatable section is translating in a direction opposite from that of continuously driven conveyor belt 24 and at the same rate of speed as conveyor belt 24 to stop the articles.

Articles are fed onto the endless conveyor by feed assembly 12. The articles are spaced apart from one another by the pitch of a feed screw 27 of the feed assembly. The feed screw, however, is stopped during labeling to prevent bottle jam-up and breakage as well as the loss of bottle indexing.

While on translatable section 18 of conveyor assembly 10, bottles are held by top grip assembly 14. The top grip assembly is coordinated with the translatable section such that there is no relative motion between belt 32 of top grip assembly and conveyor belt 24.

In greater detail, the conveyor assembly includes a drive wheel or sprocket 38 which, in operation, is constantly being driven through a drive shaft 40. The drive sprocket is journaled for rotation in bearings 41 in translatable section 18 and engages a drive chain 42. Drive chain 42 carries conveyor belt 24. As shown in FIG. 2, conveyor belt 24 is slightly elongated to compensate for the lengthening and shortening of the conveyor assembly attendant with the operation of the conveying apparatus of the present invention. The lower course of conveyor belt 24 is provided with a support 43 which prevents the belt from fouling attendant apparatus. The support has a downwardly depending portion 44 to prevent fouling of belt 24. Support 43 is attached to the conveying apparatus by any convenient means, not shown, such as vertical braces.

Translatable conveying section 18 includes a bed 45. Bed 45 has two support rails or guides 46 over which conveyor belt 24 tracks. The support rails extend longitudinally substantially the entire length of the translatable conveyor section. Each of the rails is mounted on an angle 47. Cross bracing between angles 47 are provided at regular intervals to make the translatable section rigid. One of these cross braces is shown by reference numeral 48 in FIG. 2.

The translatable section of the conveyor assembly is mounted for limited movement along the path of conveyor belt 24. For this purpose, cross members 50 mount linear bearings 52, while uprights 54 mount shafts 56. Cross members 50 pass beneath angles 47 and are secured to them as by welds. Each of the shafts 56 is received in a cooperating one of the bearings 52. These bearings are preferably of the low friction type and may be recirculating. Uprights 54 are attached to base 58.

Translatable section 18 of conveyor assembly 10 is coupled to stationary section 20 of the conveyor assembly by a pair of slip joints 60. As shown in FIG. 4, each slip joint has a female recesss 62 in a suport rail or guide 64 of stationary section 20. Male members 66 of support rails 46 are slidably received in these female recesses. The upper surface of each sliding joint lies in the same plane as the upper surface of the support rails of both the stationary and translatable sections in order that conveyor belt 24 be supported at all times despite relative movement between the translatable section and the stationary section.

Support rails 64 of stationary section 20 are supported above base 58 by uprights 67, 64 and cross braces 68. There is a total of four uprights to provide the support function. As with the translatable section, support rails 64 of the stationary section are mounted on cooperating angles 69. The rails and angles extend substantially the entire length of the stationary section. Cross braces 68 pass beneath angles 69 between cooperating pairs of uprights to provide for the mounting of the rails.

Translatable section 18 of conveyor assembly 10 is reciprocated at predetermined intervals through barrel cam drive 26. The barrel cam drive includes a barrel cam 71. Barrel cam 71 is mounted for rotation to brace 72 which in turn is securely fixed to base 58. A follower 73 mounted in a coordinating member 74 tracks in cam slot 76 of the barrel cam. A drive shaft or drag line 78 is pivotally coupled through eyes 80 and 82 to a coordinating member 74 and one of the cross braces 48, respectively. Pins 86 and 88 secure eyes 80 and 82 to coordinate member 74 and cross brace 48, respectively.

Barrel cam 71, then, determines the rate and direction of translation of translatable section 18. The barrel cam performs its function while drive sprocket 38 drives conveyor belt 24. When labeling occurs, barrel cam 71 will drive shaft 78 and translatable conveyor section 18 toward the stationary section 20 at a rate of speed equal to the rate of speed of the conveyor belt produced by the drive sprocket, but in the opposite direction. The conveyor belt's motion relative to labeling assembly 16 is therefore zero. During this time labeling is effected on articles on the conveyor. After labeling, the barrel cam translates transaltable section 18 away from stationary section 20. The effective rate of article travel relative to base 58 then becomes the sum of the speed of conveyor belt 24 and translatable section 18 away from stationary section 20.

Top grip assembly 14, shown somewhat elevated in the figures for clarity, is mounted for translation with translatable section 18 of the conveyor assembly. Mounting is effected through uprights 100 which are attached to cross members 50. A longitudinal support member 102 is attached to these uprights and spans across the top grip assembly between the upper and lower courses of top grip belt 32. Guides 104 and 106 depend from this cross member to guide bottle tops as they progress along the conveying apparatus. A shroud 108 is mounted to support member 102 as by mounting blocks 110 and 112. Top grip endless belt 32 passes over pulleys 114 and 116. Pulley 116 is driven to effect the same linear rate of speed in the lower course of belt 32 as conveyor 24. To provide for the occurrence of an occasional bottle having its cap askew a resilient, spring-like member 118 is disposed above the lower course of belt 32. Resilient member 118 yields when a protruding cap engages it, but maintains contact with the caps of bottles adjacent a bottle with a protruding cap. Resilient member 118 is secured to support member 102.

Feed assembly 12 includes feed screw 27. Feed screw 27 is journaled at one end in a bearing 125 which is mounted through a plate 127 to angle 69 of stationary portion 20. The lead screw has a pitch to effect spacing of bottles along the assembly in index with the operation of labeling assembly 16. Feed screw 27 is driven by a sprocket and chain drive 132. Sprocket and chain drive 132 includes a sprocket 134 keyed to a shaft 137 which in turn is keyed to idler sprocket 28 of conveyor assembly 10. A driven sprocket 136 of drive 132 is keyed to a shaft 138. Shaft 138 drives a right angle gear box 140 for the rotation of the lead screw. Driven sprocket 136 as well as the gear box are supported above base 58 on one of the uprights 67. As was previously mentioned, the driving of the feed screw occurs only when idler sprocket 28 is driven by chain 42 of conveyor belt 24, which in turn is dependent upon the motion of the conveyor belt proper as determined by translatable section 18.

The drives for the top grip assembly and the conveyor assembly are best illustrated in FIGS. 1 and 3. As adjustable speed motor 150 through a belt 152 drives a gear box reducer 154, a shaft 156, driven by the gear box, drives right angle gear box 158. An output shaft 159 of right angle gear box 158 drives two additional right angle gear boxes 160 and 162. Gear boxes 160 and 162 are secured to an upright 164. Upright 164 is secured to base 58. Output shafts 166 and 168 of right angle gear boxes 160 and 162 are coupled through universal joints 170 and 172 to drive shafts 174 and 176. These drive shafts are drive-coupled through universal joints 178 and 180 to drive sprocket 38 of conveyor assembly 10 and to drive pulley 116 of top grip assembly 14, respectively. Drive shafts 174 and 176 are of telescopic construction to accommodate the translation of top grip assembly 14 and translatable section 18. The drive shafts have keys to torque couple their telescopic sections together. The rotational sense of top grip drive pulley 116 and drive sprocket 38 are such that the same linear rate of speed of top grip belt 32 and the conveyor section belt 24 is effected. Thus, in FIG. 2, drive sprocket 38 is driven clockwise while pulley 116 is driven counterclockwise.

The barrel drive will now be described in greater detail. A sprocket and chain drive 182 couples barrel cam 71 to reducer 154. The sprocket and chain drive includes a drive sprocket 184 keyed on an output shaft 185 from reducer 154. Drive sprocket 184 drives a chain 186 over an idler sprocket 188 to a driven sprocket 190. Driven sprocket 190 is coupled through a shaft 192 to barrel cam 71. Shaft 192 is supported by a bearing block 193 above base 58. Follower 73 is maintained in proper position by coordinating member 74 which is mounted for oscillation on a stand 194 through a pin 196. The free end of coordinating member 74 is supported by a support 198 in a slot 200 thereof. The length of slot 200 is adequate to admit to the required movement of follower 73. Slot 76 of barrel cam 71 determines the amount of translation and the rate of translation of translatable section 18. Therefore the slot must be longitudinally long enough to effect the required amount of translation. For each revolution of barrel cam 71 translatable section 18 will move a complete cycle toward stationary section 20 and away from stationary section 20. When the barrel cam drives the translatable section towards the stationary section, the cam slot is disposed such that the linear rate of translation is effectively constant and equal to the rate at which conveyor 24 is being driven.

Labeling apparatus 16 will now be described with particular reference to FIG. 5. The description of this apparatus will not be in great detail because it is well known in the art. However, it is presented for a more complete understanding of the nature of the present invention and the problems which it solves. The labeling apparatus includes a picker plate assembly 210, a vacuum grip finger assembly 212 and a glue applicator assembly 214. All these assemblies are driven from a common shaft 185 which, as previously mentioned, is from reducer 154. A wiper assembly 216 is provided to secure the labels to the bottles after they have been placed on the bottles by the vacuum grip finger assembly 212. The wiper assembly is driven through a shaft 218 which in turn is driven by the same drive which drives barrel cam 71.

Picker plate assembly 210 includes a picker plate proper 220 which has three depending plates 222 supported on arbor 224. A crank 226 is keyed to a shaft 228 which is journaled for oscillation on a stand 230 through bearing 232. Shaft 228 has a crank 234 which is driven by a shaft 236. Shaft 236, in turn, is driven by a crank 238 on shaft 185.

The picker plates oscillate in each cycle between the position shown in FIG. 5 to a position where they pick up labels from label dispenser 240. The label dispenser is mounted on stand 230.

Glue applicator 214 includes a roller 242 which is driven in rotation by sprocket drive 244 in a glue pot 246. The sprocket drive includes a drive sprocket 248 keyed to drive shaft 185. A driven sprocket 250, which is journaled for rotation in stand 230, is keyed to a shaft 252. Shaft 252 is also keyed to roller 242. An applicator roller 254 is journaled for rotation on a crank 256 which in turn is keyed to a shaft 258. A crank 260 is keyed to shaft 258. A tower shaft 262 is coupled to crank 234 for the latter's oscillation. A yoke 264 has a longitudinal recess 266 which receives drive shaft 185. Shaft 262 is connected to yoke 264. Yoke 264 has a roller 266 for tracking on a kidney-shaped cam 268. Cam 268 is keyed to drive shaft 185. A spring 270 is provided to bias roller 266 downwardly onto the cam surface of cam 268. Kidney-shaped cam 268 is disposed such that applicator roller 254 oscillates between roller 242 to position above picker plate 220. The drives of applicator roller 254 and picker plate 220 are such that applicator roller 254 will apply glue to the face of plates 222 as these plates move towards their upper position but before they reach label dispenser 240. These drives are also such that the applicator roller gently wipes its glue against plates 222 during glue transfer. Before plates 222 reach the label dispenser, applicator roller 254 moves out of the path of the plates. When plates 222 reach label dispenser 240, a pair of labels are transferred to the plates.

Vacuum grip assembly 212 includes a pair of fingers 272 which are carried by a shaft 274 through a pair of bushings 276. Bushings 276 through pins 278 carry a cross member 280. Bushings 276 are secured to shaft 274. Cross member 280 mounts the two vacuum grip fingers. A vacuum line 282 is disposed between the fingers to apply, at predetermined times, vacuum therein. As in prior art labeling apparatus, the vacuum fingers have a vacuum applied only when the fingers take the labels from picker plates 222. In addition, a well known blowout can be provided to clean the ports of the vacuum grip fingers after labels have been applied.

Grip fingers 272 are capable of rotation from a downward position to the position illustrated in FIG. 5 and for further limited rotation towards articles being conveyed on conveyor belt 24.

To this end, a vacuum finger grip drive 284 includes cranks 286 and 288 which are journaled on a shaft 290 supported in stand 230. Crank 286 is rotatably coupled to an arm 292. Arm 292 passes under drive shaft 185. A shaft 294 is connected to arm 292 at one end and to a crank 296 at its other end. Crank 296 is keyed to shaft 274. Movement of shaft 294 therefore produces movement of grip fingers 272.

A cam 298 is keyed to shaft 185. A roller 300 is mounted to arm 292. A spring 302 is attached to arm 292 and base 58 to bias it toward conveyor belt 24. Cam 298, then, drives arm 292 back and forth to oscillate vacuum grip fingers 272 through crank 296.

Crank 288 is journaled on shaft 290. An arm 304 is carried by crank 288 and passes beneath drive shaft 185. This arm in turn carries a shaft 306 which is rotatably connected to a crank 308. Crank 308 is keyed to shaft 274. A spring 310 is connected to arm 304 and to base 58 to bias the arm toward conveyor belt 24. A high-rise cam 312 is keyed to shaft 185. A roller 314 on arm 304 is disposed to be actuated by cam 312.

Cam 298 is configured such that grip fingers 272 will move from their retracted position to the position illustrated in FIG. 5 by engagement of roller 300 with the cam. When vacuum has been applied in the grip fingers to hold labels on them, high-rise cam 312 through roller 314 causes the grip fingers to move inwardly a small amount and apply labels to bottles on endless conveyor 24.

Wiper assembly 216 includes a pair of spaced-apart arms 316 which carry a wiper assembly 318 in the form of a support member 320 and a resilient member 322. Four recesses in this resilient member are disposed to engage the labels applied by grip fingers 272 to bottles and force them onto the bottles. A crank 324 keyed to shaft 218 carries a shaft 326. Shaft 326 is slidably coupled to one of the arms 316 through a bushing 328. A spring 330 force couples the wiper assembly 216 to shaft 326 and allows some give when wiping labels. A spring 332 biases the entire wiper assembly away from the line of bottles.

Arms 316 are rotatably mounted to base 58 through a pair of mounts. Shaft 218 is journaled in a pair of bearing blocks 336. A crank 338 is keyed to shaft 218. Crank 338 has a roller 340 for engagement by a crank 342. Crank 342 is keyed to a shaft 344. Shaft 344 is driven by a suitable drive from reducer 154. Such a drive may be in the form of a sprocket and chain drive 346 illustrated in FIGS. 1 and 5.

The operation of the apparatus of the present invention will now be described.

The labeling apparatus of the present invention receives bottles or other containers from input conveyor 30. Feed screw 27 advances these bottles and spaces them apart when sprocket and chain drive 132 is being driven by conveyor 24. Barrel cam drive 26 continuously translates translatable section 18 back and forth with respect to stationary section 20. As was previously mentioned, when translatable section 18 is moving towards stationary section 20, it does so at the same rate of speed but in the opposite direction that conveyor 24 is being driven by drive sprocket 38. As such, conveyor 24 is stationary on stationary section 20 and idler sprocket 28 is not being driven. When sprocket 28 is stopped, feed screw 27 is stopped. Therefore, bottles or other containers are not being admitted into the labeling section of the apparatus.

Bottles are advanced, however, when translatable section 18 moves away from stationary section 20 in response to barrel cam drive 26.

When a pair of bottles reaches the labeling section of the apparatus, vacuum grip fingers 272 will take the labels from picker plates 222 and apply them to the bottles. At this point in the cycle, translatable section 18 is moving towards stationary section 20 at a rate of speed equal to the rate of conveyor travel on the translatable section. Therefore, the bottles will be arrested in their path towards the output of the conveyor apparatus. During bottle arrest, high rise cam 312 drives arm 304 to rotate grip fingers 272 slightly towards the conveyor to take the labels from picker plate assembly 210 and apply them to the bottles. Simultaneously with this application, wiper assembly 216 engages bottles further along the line to secure the labels applied by vacuum grip finger assembly 212. Picker plate assembly 210 begins to oscillate upwardly to pick up another pair of labels from label dispenser 240 after an application of labels. In the course of this travel, applicator roller 254 will pass across the picker plates to apply glue. As the picker plates descend toward their transfer position, applicator roller 254 will descend for engagement with roller 242 for receiving more glue. Before the labels, secured by their mucilage to the picker plates, arrive for transfer to vacuum grip fingers 272, the vacuum grip fingers will be retracted by cam 298 to enable labels to be positioned between fingers 272 and picker plates 222. About the time the picker plate reaches its transfer point, vacuum grip fingers 272, in response to rotation of cam 298, in forcing shaft 294 against the bias of spring 302, will rotate the fingers upward to take the labels from the picker plates. A new cycle is then commenced.

During a cycle, top grip assembly 14 is constantly being driven, as is drive sprocket 38 of conveyor 24. As was previously mentioned, the lower course of belt 32 of top grip assembly 14 is driven in the same direction and at the same rate of speed as the upper course of conveyor 24. As the top grip assembly, together with the translatable portion of the conveyor assembly, translate away from the stationary portion of the conveyor assembly, bottles will be conveyed toward the apparatus' output. This occurs between successive label applications.

What is claimed is:

1. An apparatus for transporting articles from an input station to an output station and for stopping the articles between the stations for processing, the apparatus comprising:
   (a) a stationary conveying section having a bed defining a first conveyor support surface;
   (b) a translatable conveying station having a bed defining a second conveyor support surface, the translatable conveying section being disposed relative to the stationary conveying section such that a substantially continuous support surface is defined by the first and second support surfaces of both the sections;
   (c) an endles conveyor caired by the stationary and translatable conveying sections on their support surfaces;
   (d) means for driving the endless conveyor to transport articles thereon from the input station to the output station over the support surfaces of the stationary and translatable conveying sections, the driving means being operable to drive the endless conveyor at a predetermined rate of speed with respect to the translatable section;
   (e) means for translating the translatable section toward and away from the stationary section while the driving means is driving the endless conveyor, the translating means being operable to translate the translatable section toward the stationary section at a rate of speed equal to the predetermined rate of speed of the endless conveyor on the translatable section but in the opposite direction, whereby, during translation of the translatable section toward the stationary section articles on the endless conveyor over the translatable section are stopped; and
   (f) means to feed articles onto the endless conveyor over the stationary section, the feed means being driven by the endless conveyor at a point on the stationary section, whereby, the feed means stops when the translatable section translates toward the stationary section.

2. An apparatus for transporting articles from an input station to an output station and for stopping the articles between the stations for processing, the apparatus comprising:
   (a) a stationary conveying section having a bed defining a first conveyor support surface;
   (b) a translatable conveying station having a bed defining a second conveyor support surface, the translatable conveying section being disposed relative to the stationary conveying section such that a substantially continuous support surface is defined by the first and second support surfaces of both the sections;
   (c) an endless conveyor carried by the stationary and translatable conveying sections on their support surfaces;
   (d) means for driving the endless conveyor to transport articles thereon from the input station to the output station over the support surfaces of the stationary and translatable conveying sections, the driving means being operable to drive the endless conveyor at a predetermined rate of speed with respect to the translatable section;
   (e) means for translating the translatable section toward and away from the stationary section while the driving means is driving the endless conveyor, the translating means being operable to translate the translatable section toward the stationary section at a rate of speed equal to the predetermined rate of speed of the endless conveyor on the translatable section but in the opposite direction, whereby, during translation of the translatable section toward the stationary section articles on the endless conveyor over the translatable section are stopped; and
   (f) means to grip articles being conveyed over the translatable section at the same rate of speed as the endless conveyor over the translatable section.

3. The apparatus claimed in claim 2 wherein:
   (a) the grip means includes a top grip assembly carried by the translatable section for translation therewith, the top grip assembly including an endless top grip belt disposed over the translatable section to define a continuous gripping length along the translatable section for gripping the tops of articles on the translatable section; and
   (b) means is provided to drive the top grip belt such that the gripping length thereof travels at the same rate of speed and in the same direction as the endless conveyor over the translatable section.

4. The apparatus claimed in claim 3 wherein:
   means is provided to feed articles onto the endless conveyor over the stationary section, the feed means having drive means responsive to the endless conveyor's speed on the stationary section such that the feed means stops when the endless conveyor on the stationary section stops during translation of the translatable section toward the stationary section.

5. The apparatus claimed in claim 1 wherein:
   (a) an idler wheel rotatably carried by the stationary section and driven by the endless conveyor is provided;
   (b) the feed means includes a feed screw; and
   (c) means is provided to drive couple the feed screw and the idler wheel.

6. An apparatus for labeling bottles and the like received at an input station and discharged at an output station with labeling occuring at a labeling station intermediate the input and output stations, the apparatus comprising:
   (a) an endless conveyor for transporting bottles from the input station to the output station;
   (b) a stationary conveying section having means for providing support for the endless conveyor proximate the input station;

(c) a translatable section having means for supporting the endless conveyor at the labeling section, the translatable section being disposed relative to the stationary section to provide a continuous endless conveyor support therewith from the input to the output station;

(d) means for driving the endless conveyor to convey articles from the input station to the output station; and (e) means for translating the translatable section toward the stationary section at a rate of speed equal to but opposite in direction from the rate of speed of the conveyor on the translatable section at predetermined intervals for the application of labels to the bottles, and for translating the translatable section away from the stationary section for the transport of labeled bottles to the output station.

7. The apparatus claimed in claim 6 wherein:
(a) bottle feed means is provided to feed bottles onto the endless conveyor on the stationary conveying section; and
(b) drive means for the feed means is provided, the drive means being driven by the endless conveyor at a point on the stationary conveying section to stop the feed means when the translatable section is translating toward the stationary section.

8. The apparatus claimed in claim 7 wherein:
the drive means for the feed means includes an idler wheel engaged by the endless conveyor and means coupling the feed screw to the idler wheel.

9. The apparatus claimed in claim 6 wherein:
means is provided to grip bottles during labeling, the grip means being operable to travel at the same rate of speed as the endless conveyor on the translatable section.

10. The apparatus claimed in claim 6 wherein:
(a) a top grip assembly is provided, the top grip assembly being carried by the translatable section for translation therewith and having an endless top grip belt, the top grip belt being disposed over the translatable section to define a continuous gripping length along the translatable section for gripping the tops of bottles on the translatable section; and
(b) means is included to drive the top grip belt such that the gripping length thereof travels at the same rate of speed and in the same direction as the endless conveyor over the translatable section.

11. The apparatus claimed in claim 10 wherein:
means is provided to feed articles onto the endless conveyor over the stationary section, the feed means having drive means driven by the endless conveyor on the stationary section such that the feed means stops when the endless conveyor on the stationary section stops during translation of the translatable section toward the stationary section.

12. The apparatus claimed in claim 11 wherein the feed means includes:
(a) a feed screw;
(b) an idler wheel rotatably carried by the stationary section and driven by the endless conveyor; and
(c) a drive coupling the idler wheel to the feed screw.

13. An apparatus for conveying bottles and the like from an input station to an output station past a labeling station comprising:
(a) a stationary conveying section having means for supporting a length of an endless conveyor;
(b) a translatable conveying section having means for supporting a length of an endless conveyor which cooperates with the support means of the stationary conveying section to define together therewith a substantially continuous endless conveyor support;

(c) an endless conveyor carried by the stationary section and the translatable section on the continuous support thereof;
(d) means for driving the endless conveyor at the translatable section to convey bottles from the input station to the output station;
(e) means for translating the translatable section toward and away from the stationary section, the translating means being operable when translating the translating section toward the stationary conveying section to do so at a rate equal to but opposite in direction from the rate the endless conveyor travels with respect to the translating section in response to the endless conveyor drive means to stop bottles for labeling at the labeling station;
(f) input means for feeding bottles onto the endless conveyor before they reach the labeling station and to space bottles in index with a labeling apparatus at the labeling station;
(g) means for driving the input means by the endless conveyor on the stationary conveying section to stop the input means when the translating means is translated toward the stationary section;
(h) top grip means carried by the translatable section, the top grip means having an endless belt disposed above the endless conveyor for engaging the tops of bottles passing over the translatable section; and
(i) means for driving the belt of the top grip means such that the portion thereof which is capable of engaging bottle tops travels at the same rate of speed and in the same direction as the endless conveyor on the translatable section.

14. The apparatus claimed in claim 13 wherein:
(a) the means for driving the endless conveyor includes a drive wheel journaled for rotation on the translatable section and engaged with the endless conveyor; and
(b) the means for driving the input means includes an idler wheel journaled for rotation on the stationary section and engaged with the endless conveyor, and a drive between the idler wheel and the input means.

15. The apparatus claimed in claim 14 wherein:
the input means includes a feed screw disposed to receive bottles on the endless conveyor at the stationary section, the feed screw having a helix for developing the spacing between bottles.

16. The apparatus claimed in claim 15 wherein:
(a) the endless conveyor has a continuous drive chain;
(b) the drive wheel is a sprocket engaged with the endless drive chain; and
(c) the idler wheel is a sprocket engaged with the endless drive chain.

17. The apparatus claimed in claim 15 wherein the translating means includes:
(a) a barrel cam having a cam slot to effect a constant rate of translation toward the stationary section;
(b) a follower in the cam slot;
(c) a drag link attached to the translatable section and responsive to the cam follower.

References Cited
UNITED STATES PATENTS

| | | | |
|---|---|---|---|
| 594,054 | 11/1897 | Wood | 271—78 |
| 1,291,844 | 1/1919 | Green | 198—76 |

JOSEPH WEGBREIT, Primary Examiner

U.S. Cl. X.R.

198—76